US009743267B2

(12) United States Patent
Schuler et al.

(10) Patent No.: US 9,743,267 B2
(45) Date of Patent: Aug. 22, 2017

(54) METHOD, DEVICE, AND SYSTEM FOR IMPROVING DEVICE PAIRING BETWEEN A SCANNING WIRELESS RADIO COMMUNICATION DEVICE AND TARGET WIRELESS ELECTRONIC DEVICES

(71) Applicant: MOTOROLA SOLUTIONS, INC, Schaumburg, IL (US)

(72) Inventors: Francesca Schuler, Palatine, IL (US); Jorge M. Alayo Espino, Chicago, IL (US)

(73) Assignee: MOTOROLA SOLUTIONS, INC., Chicago, IL (US)

( * ) Notice: Subject to any disclaimer, the term of this patent is extended or adjusted under 35 U.S.C. 154(b) by 0 days.

(21) Appl. No.: 14/971,581

(22) Filed: Dec. 16, 2015

(65) Prior Publication Data

US 2017/0180971 A1 Jun. 22, 2017

(51) Int. Cl.
| | | |
|---|---|---|
| *H04B 7/00* | (2006.01) | |
| *H04W 8/00* | (2009.01) | |
| *H04W 8/24* | (2009.01) | |
| *H04W 76/02* | (2009.01) | |
| *H04W 4/00* | (2009.01) | |
| *H04W 84/12* | (2009.01) | |

(52) U.S. Cl.
CPC .......... *H04W 8/005* (2013.01); *H04W 4/008* (2013.01); *H04W 8/24* (2013.01); *H04W 76/023* (2013.01); *H04W 84/12* (2013.01)

(58) Field of Classification Search
CPC ....... H04W 4/08; H04W 8/005; H04W 48/08; H04W 76/02; H04W 84/20

USPC ...................................... 455/41.2–41.3, 566
See application file for complete search history.

(56) References Cited

U.S. PATENT DOCUMENTS

| | | |
|---|---|---|
| 6,904,275 B2 | 6/2005 | Stanforth |
| 7,801,079 B2 | 9/2010 | Saidi et al. |
| 7,969,928 B2 | 6/2011 | Chiricescu et al. |
| 8,509,923 B2 | 8/2013 | Koskan et al. |
| 8,823,518 B2 | 9/2014 | Swope |

(Continued)

OTHER PUBLICATIONS

The International Search Report and the Written Opinion, corresponding patent application No. PCT/US2016066139, dated Dec. 12, 2016, all pages.

*Primary Examiner* — Simon Nguyen (57) ABSTRACT

Improved device pairing between a scanning wireless radio communication device and target wireless electronic devices is provided by initiating a discovery process and during the discovery process: receiving, from each of a plurality of target wireless electronic devices, wireless pairing information, receiving, from some or all of the target wireless electronic devices, and in addition to the wireless pairing information, physical state information describing a particular physical state of the target wireless electronic device; for each target wireless electronic device providing the particular physical state of the target wireless electronic device, correlating the received physical state information with state information stored at the scanning wireless radio communication device and associated with an indication that the target wireless electronic device is a preferred discoverable target wireless electronic device; and initiating pairing with or displaying only those physical stated correlated target wireless electronic devices.

20 Claims, 3 Drawing Sheets

(56) References Cited

U.S. PATENT DOCUMENTS

| | | | |
|---|---|---|---|
| 2004/0253923 A1 | 12/2004 | Braley et al. | |
| 2007/0238411 A1* | 10/2007 | House | H04M 1/6066 |
| | | | 455/41.2 |
| 2007/0254709 A1 | 11/2007 | Higgins | |
| 2012/0083209 A1 | 4/2012 | Giles et al. | |
| 2012/0137346 A1* | 5/2012 | Lee | G06F 21/606 |
| | | | 726/4 |
| 2014/0195654 A1* | 7/2014 | Kiukkonen | H04W 8/00 |
| | | | 709/220 |
| 2014/0198724 A1 | 7/2014 | Abraham et al. | |
| 2014/0364060 A1* | 12/2014 | Srivatsa | H04W 4/008 |
| | | | 455/41.2 |
| 2015/0098361 A1 | 4/2015 | Zhang et al. | |
| 2015/0147970 A1 | 5/2015 | Tan et al. | |
| 2015/0309809 A1 | 10/2015 | Shin et al. | |
| 2016/0157083 A1* | 6/2016 | Reunamaki | H04W 8/005 |
| | | | 370/329 |
| 2016/0165651 A1* | 6/2016 | Pathuri | H04W 76/021 |
| | | | 370/329 |
| 2016/0226732 A1* | 8/2016 | Kim | H04L 43/065 |
| | | | 709/224 |

* cited by examiner

METHOD, DEVICE, AND SYSTEM FOR IMPROVING DEVICE PAIRING BETWEEN A SCANNING WIRELESS RADIO COMMUNICATION DEVICE AND TARGET WIRELESS ELECTRONIC DEVICES

BACKGROUND OF THE INVENTION

In some communication scenarios, it is desirable to have wireless device pairing, for instance pairing of a scanning wireless radio communication device such as a mobile radio with multiple target wireless electronic devices such as wireless accessory devices when the mobile radio and the accessory devices implement a wireless protocol, such as Bluetooth or IEEE 802.11 Wi-Fi. One example scenario where such wireless device pairing is desired is in the area of Public Safety. More particularly, Public Safety officers may select mobile radios that implement the Bluetooth protocol from a pool of mobile radios in a multi-unit charger and pair their own wireless accessory devices with the selected mobile radio; and this accessory pairing procedure may occur every time an officer picks up a mobile radio from a pool of available mobile radios maintained at a station house or other location. Additionally or alternatively, the Public Safety officer may pick up wireless accessory devices from a pool of wireless accessory devices, and may have to pair each wireless accessory device with his or her mobile radio. While all of this pairing is taking place, numerous other Bluetooth devices may be present in the surrounding area of the Public Safety officer, and the Public Safety officer may have a difficult time determining which devices to pair with on the mobile radio pairing interface.

Known pairing technologies thus have shortcomings in providing quick and easy pairing between a mobile radio and desired multiple wireless accessory devices. Further, as officers collect more and more wireless accessory devices in and around their person, such as biomedical sensors, video cameras, remote speaker microphones (RSMs), smart glasses, ear buds, etc., the amount of time and number of steps needed to be completed every time the officer obtains a new mobile radio or new wireless accessory device becomes burdensome.

Thus, there exists a need for an improved method and system for device pairing between a scanning wireless radio communication device such as a mobile radio and target wireless electronic devices such as wireless accessory devices.

BRIEF DESCRIPTION OF THE SEVERAL VIEWS OF THE DRAWINGS

The accompanying figures, where like reference numerals refer to identical or functionally similar elements throughout the separate views, which together with the detailed description below are incorporated in and form part of the specification and serve to further illustrate various embodiments of concepts that include the claimed invention, and to explain various principles and advantages of those embodiments.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION OF THE INVENTION

Disclosed is an improved method, device, and system for device pairing between a scanning wireless radio communication device such as a mobile radio and target wireless electronic devices such as wireless accessory devices.

In one embodiment a process for improving device pairing between a scanning wireless radio communication device and target wireless electronic devices includes, at the scanning wireless radio communication device: initiating, via a first wireless transceiver of the scanning wireless radio communication device, a discovery process for discovering available target wireless electronic devices for wireless pairing via the first wireless transceiver, and during the discovery process: receiving, from each of a plurality of target wireless electronic devices, wireless pairing information including one or more of a wireless address of the target wireless electronic device, a wireless device name of the target wireless electronic device, clock information of the target wireless electronic device, a class type of the target wireless electronic device, a page scan mode of the target wireless electronic device, a timestamp, a beacon interval, a Service Set Identifier (SSID), supported transmission rates, and supported security protocols; receiving, from some or all of the target wireless electronic devices, and in addition to the wireless pairing information, physical state information describing a particular physical state of the target wireless electronic device; for each target wireless electronic device providing the particular physical state of the target wireless electronic device, correlating the received physical state information with state information stored at the scanning wireless radio communication device and associated with an indication that the target wireless electronic device is a preferred discoverable target wireless electronic device; and one of (i) the scanning wireless radio communication device automatically initiating pairing with each one or more target wireless electronic devices providing the received physical state information that positively correlates with the state information stored at the wireless radio communication device and (ii) displaying, via a wireless pairing selection display of the scanning wireless radio communication device, only those one or more target wireless electronic devices providing the received physical state information that positively correlates with the state information stored at the scanning wireless radio communication device.

In a further embodiment, a wireless radio communication device for improving device pairing with target wireless electronic devices includes: one or more short-range wireless transceivers; a microphone; a speaker; a display; a data store; and one or more processors configured to: initiate, via a first wireless transceiver of the one or more short-range wireless transceivers, a discovery process for discovering available target wireless electronic devices for wireless pairing via the first wireless transceiver, and during the discovery process: receive, from each of a plurality of target wireless electronic devices via the one or more short-range wireless transceivers, wireless pairing information including one or more of a wireless address of the target wireless electronic device, a wireless device name of the target wireless electronic device, clock information of the target wireless electronic device, a class type of the target wireless electronic device, a page scan mode of the target wireless electronic device, a timestamp, a beacon interval, a Service Set Identifier (SSID), supported transmission rates, and supported security protocols; receive, from some or all of the target wireless electronic devices via the one or more short-range wireless transceivers, and in addition to the wireless pairing information, physical state information describing a particular physical state of the target wireless electronic device; for each target wireless electronic device providing the particular physical state of the target wireless electronic device, correlate the received physical state information with state information stored at the scanning wireless radio communication device and associated with an indication that the target wireless electronic device is a preferred discoverable target wireless electronic device; and one of (i) automatically initiate pairing with each one or more target wireless electronic devices providing the received physical state information that positively correlates with the state information stored at the wireless radio communication device and (ii) display, on the display, only those one or more target wireless electronic devices providing the received physical state information that positively correlates with the state information stored at the scanning wireless radio communication device.

Each of the above-mentioned embodiments will be discussed in more detail below, starting with example network and device architectures of the system in which the embodiments may be practiced, followed by an illustration of processing steps and message transmissions and/or receptions for improved device pairing between a scanning wireless radio communication device and target wireless electronic devices from a scanning wireless radio communication device perspective. Further advantages and features consistent with this disclosure will be set forth in the following detailed description, with reference to the figures.

1. System Architecture and Device Structures

Figure 1:
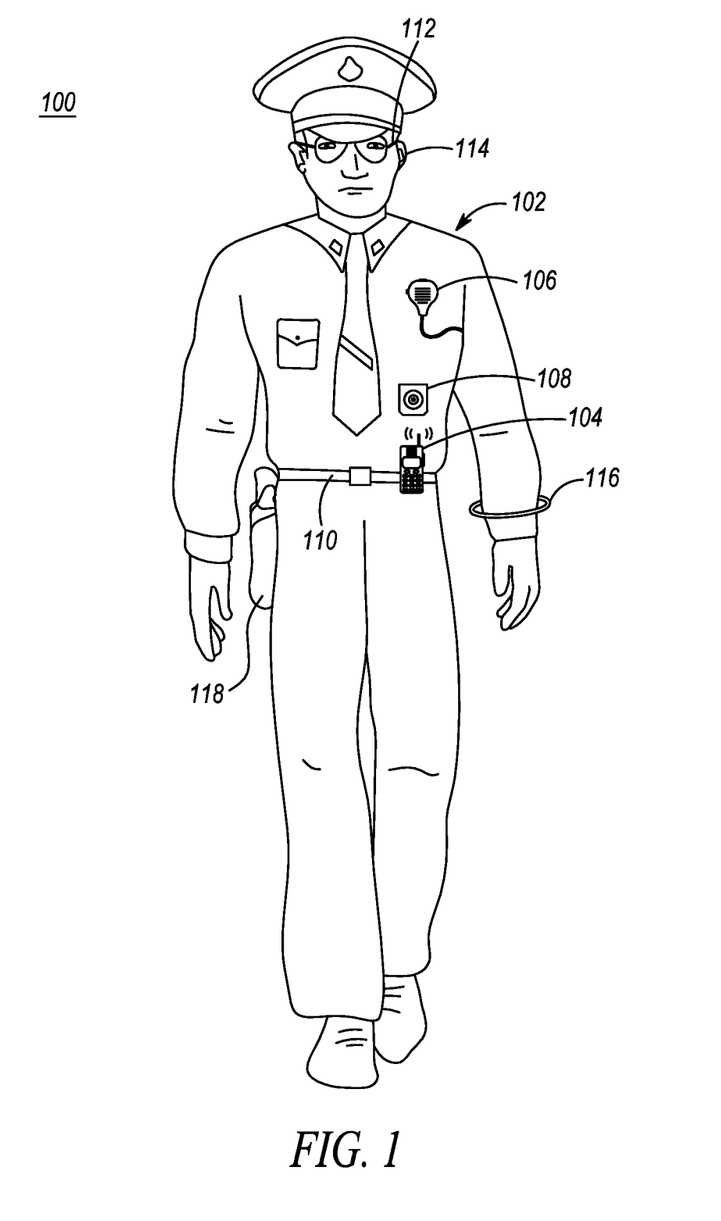
FIG. 1 is a system diagram illustrating an officer wearing a plurality of target wireless electronic devices and a scanning wireless radio communication device that implements improved device pairing in accordance with some embodiments.

Referring now to the drawings, and in particular FIG. 1, a system diagram illustrates a system 100 of wireless devices that a user 102 (such as an officer or other person) may wear, including a primary scanning wireless radio communication device 104, which in this example is a mobile radio used for narrowband and/or broadband communications, and a plurality of target wireless electronic devices, which in this example is a plurality of wireless accessory devices including a remote speaker microphone (RSM) 106, a video camera 108, a biometric sensor device 110, a pair of smart glasses 112, an earpiece 114, an activity tracker 116, and a weapon status detector 118.

The radio communication device 104 may be any wireless device used for infrastructure-supported or direct mode media (e.g., voice, audio, video, etc.) communication via a long-range transmitter (e.g., in comparison to a short-range transmitter such as a Bluetooth, IEEE 802.11 Wi-Fi, Zigbee, IrDA, or NFC transmitter) and/or transceiver with other radio communication devices or infrastructure devices. The long-range transmitter may have a transmit range on the order of miles, e.g., 0.5-50 miles, or 1-10 miles (or a similar range in meters).

Infrastructure-supported long-range wireless communications may be made via radio access networks (RANs) that provide for radio communication links to be arranged within the network between a plurality of wireless radio communication devices. Such wireless radio communication devices may also be known as 'mobile stations' or 'subscriber devices.' At least one other terminal, e.g. used in conjunction with wireless radio communication devices, may be a fixed terminal, e.g. a base station, eNodeB, repeater, and/or access point. Such a RAN typically includes a system infrastructure which generally includes a network of various fixed terminals that are in direct radio communication with the wireless radio communication devices. Each of the fixed terminals operating in the RAN may have one or more transceivers that may, for example, serve wireless radio communication devices in a given region or area, known as a 'cell' or 'site', by radio frequency (RF) communication. The wireless radio communication devices that are in direct communication with a particular fixed terminal are said to be served by the fixed terminal. In one example, all radio communications to and from each wireless radio communication device within the RAN are made via respective serving fixed terminals. Sites of neighboring fixed terminals may be offset from one another and may be non-overlapping or partially or fully overlapping with one another.

RANs may operate according to an industry standard land mobile radio (LMR) protocol such as, for example, the Project 25 (P25) standard defined by the Association of Public Safety Communications Officials International (APCO), the TETRA standard defined by the European Telecommunication Standards Institute (ETSI), the Digital Private Mobile Radio (dPMR) standard also defined by the ETSI, or the Digital Mobile Radio (DMR) standard also defined by the ETSI. RANs may additionally or alternatively operate according to an industry standard broadband protocol such as, for example, the Long Term Evolution (LTE) protocol including multimedia broadcast multicast services (MBMS), the open mobile alliance (OMA) push to talk (PTT) over cellular (OMA-PoC) standard, the voice over IP (VoIP) standard, or the PTT over IP (PoIP) standard, among many other possibilities. Because the LMR systems generally provide lower throughput than the broadband systems, they are sometimes designated narrowband RANs.

Communications in accordance with any one or more of these protocols or standards, or other protocols or standards, may take place over physical channels in accordance with one or more of a TDMA (time division multiple access), FDMA (frequency divisional multiple access), OFDMA (orthogonal frequency division multiplexing access), or CDMA (code division multiple access) protocol. Wireless radio communication devices in RANs such as those set forth above send and receive media streams (encoded portions of voice, audio, and/or audio/video streams) in a call in accordance with the designated protocol.

Individual (e.g., one to one) or group (e.g., one to many) calls may be made between wireless and/or wireline participants in accordance with the narrowband or broadband protocol or standard. Group members for group calls may be statically or dynamically defined. That is, in a first example, a user or administrator working on behalf of the user may indicate to the switching and/or radio network (perhaps at a controller device, such as a call controller, PTT server, serving gateway, radio network controller (RNC), zone controller, or mobile management entity (MME), base station controller (BSC), mobile switching center (MSC), site controller, Push-to-Talk controller, or other network device) a list of participants of a group at the time of the call or in advance of the call. The group members (e.g., wireless radio communication devices) could be provisioned in the network by the user or an agent, and then provided some form of group identity or identifier, for example. Then, at a future time, an originating user in a group may cause some signaling to be transmitted indicating that he or she wishes to establish a communication session (e.g., group call) with each of the pre-designated participants in the defined group. In another example, wireless radio communication devices may dynamically affiliate with a group (and also disassociate with the group) perhaps based on user input, and the switching and/or radio network may track group membership and route new group calls according to the current group membership.

Although in the example of FIG. 1 a wireless radio communication device including a long-range transmitter is used as an example primary scanning wireless radio communication device, in other embodiments, other types of wireless radio communication devices may be used, with or without a long-range transmitter, including but not limited to, a tablet computer, a laptop computer, and a mobile phone device that provides individual or group-communication services over a short-range wireless communications link, such as but not limited to IEEE 802.11 Wi-Fi or Bluetooth.

In the example of FIG. 1, the wireless radio communication device 104 forms the hub of communication connectivity for the officer, through which other target wireless electronic devices, such as the wireless accessory devices 106-118, may communicate. In order to communicate with such other target wireless electronic devices, the wireless radio communication device 104 also contains a short-range transmitter (e.g., in comparison to the long-range transmitter such as a LMR or Broadband transmitter or in addition to another short-range transmitter) and/or transceiver. The short-range transmitter may be a Bluetooth or IEEE 802.11 Wi-Fi transmitter having a transmit range on the order of 0.01-100 meters, or 0.1-10 meters.

Target wireless electronic devices 106-118 communicate with the wireless radio communication device 104 via their own short-range transmitter and/or transceivers, and provide specialized function extensions to the wireless radio communication device 104. For example, the RSM 106 may act as a remote microphone that the user 102 may access more easily and is better positioned near the user's 102 mouth. Audio and/or voice received at the RSM 106 may be provided to the wireless radio communication device 104 for further transmission via its long-range transmitter or secondary short-range transmitter to other users. A speaker may also be provided in the RSM 106 unit such that audio and/or voice received at the wireless radio communication device 104 is transmitted to the RSM 106 and reproduced closer to the user's 102 ear.

The video camera 108 may be an always-on device or an activated-on-demand video capture device that provides video and/or audio to the wireless radio communication device 104 for storage at the wireless radio communication device 104 or for further transmission to a dispatch center or to other wireless radio communication device users via the wireless radio communication device's 104 long-range-transmitter.

The biometric sensor device 110 may be a device capable of sensing biometric data of its wearer, such as heart rate, body temperature, etc. Additionally or alternatively, an environmental sensor may be provided to detect environmental parameters such as oxygen levels, temperature, radiation, etc. The biometric sensor device 110 provides measured parameter information to the wireless radio communication device 104 for storage and/or analysis at the wireless radio communication device 104 and/or for further transmission to a dispatch center or to other users via the radio's long-range-transmitter.

The smart glasses 112 may maintain a bi-directional connection with the wireless radio communication device 104 and provide an always-on or on-demand video feed pointed in a direction of the officer's gaze, and/or may provide a personal display via a projection mechanism integrated into the smart glasses 112 for displaying information such as text, images, or video received from the wireless radio communication device 104. In some embodiments, an additional user interface mechanism such as a touch interface may be provided on the smart glasses 112 that allows the user 102 to interact with the display elements displayed on the smart glasses 112.

The earpiece 114 may maintain an audio connection with the wireless radio communication device 104 and provide the user 102 the ability to discretely hear private or group communications received at the wireless radio communication device 104 from other wireless radio communication devices or from an infrastructure device, and which may be provided to the earpiece 114 for private reproduction to the user 102.

The activity tracking device 116 may be an electronic device for tracking an activity of the user 102, and may include one or more movement sensors (such as an accelerometer, magnetometer, and/or gyroscope) that may periodically or intermittently provide to the wireless radio communication device 104 indications of orientation, direction, steps, acceleration, and/or speed, perhaps accompanying other information. An accelerometer is a device that measures acceleration. Single and multi-axis models are available to detect magnitude and direction of the acceleration as a vector quantity, and can be used to sense orientation, acceleration, vibration shock, and falling. A gyroscope is a device for measuring or maintaining orientation, based on the principles of conservation of angular momentum. One type of gyroscope, a microelectromechanical system (MEMS) based gyroscope, uses lithographically constructed versions of one or more of a tuning fork, a vibrating wheel, or resonant solid to measure orientation. Other types of gyroscopes could be used as well. A magnetometer is a device used to measure the strength and/or direction of the magnetic field in the vicinity of the device, and can be used to determine a direction in which a person or device is facing. Other types of movement sensors could additionally, or alternatively, be used as well. Although the mobility tracker 116 is shown in FIG. 1 as a bracelet worn around the wrist, in other examples, the mobility tracker 116 may be worn around another part of the body, or may take a different physical form including an earring, a finger ring, a necklace, or some other type of wearable form factor.

The weapon status sensor 118 may maintain state information regarding a weapon normally holstered within the user's 102 weapon holster. The weapon status sensor may detect a change in state (presence to absence) and/or an action (removal) relative to a weapon normally holstered within the holster to which the sensor is coupled. The detected change in state and/or action may be reported to the wireless radio communication device 104 via its short-range transceiver. In some embodiments, the weapon status sensor 118 may also detect whether the first responder's hand is resting on the weapon even if it has not yet been removed from the holster and provide such information to wireless radio communication device 104. Other possibilities exist as well.

Figure 2:
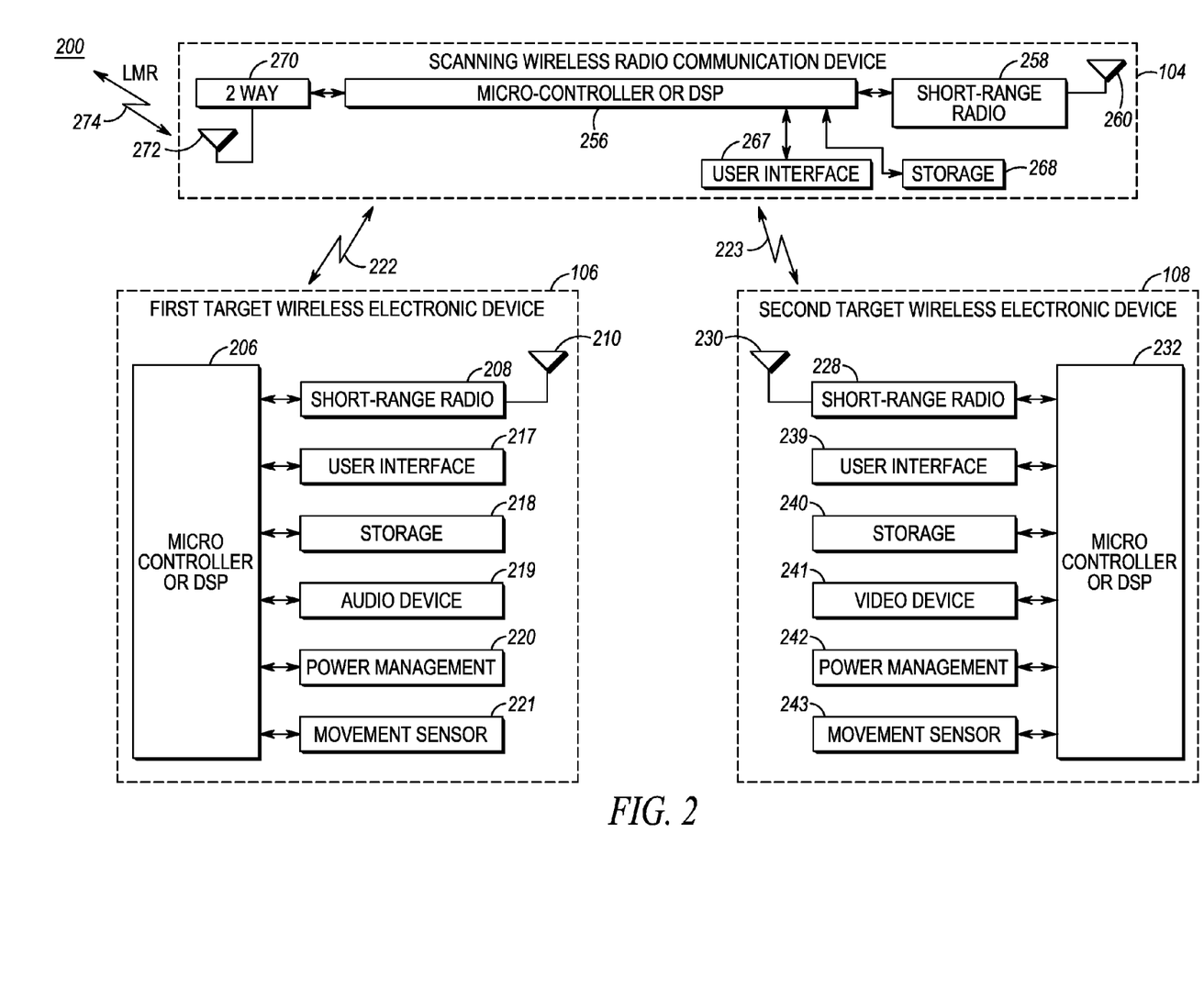
FIG. 2 is a pictorial diagram showing device structures and wireless interfaces between a scanning wireless radio communication device and a plurality of target wireless electronic devices in accordance with some embodiments.

FIG. 2 provides a more detailed block diagram of several of the major components of the system 100, including the scanning wireless radio communication device 104, a first target wireless electronic device (e.g., the RSM of FIG. 1) 106, and a second target wireless electronic device (e.g., the video camera of FIG. 1) 108. While only two target wireless electronic devices 106, 108 are illustrated in FIG. 2 for ease of illustration, other embodiments may include one target wireless electronic device or more than two target wireless electronic devices having same or similar structures to that illustrated in FIG. 2.

Figure 3:
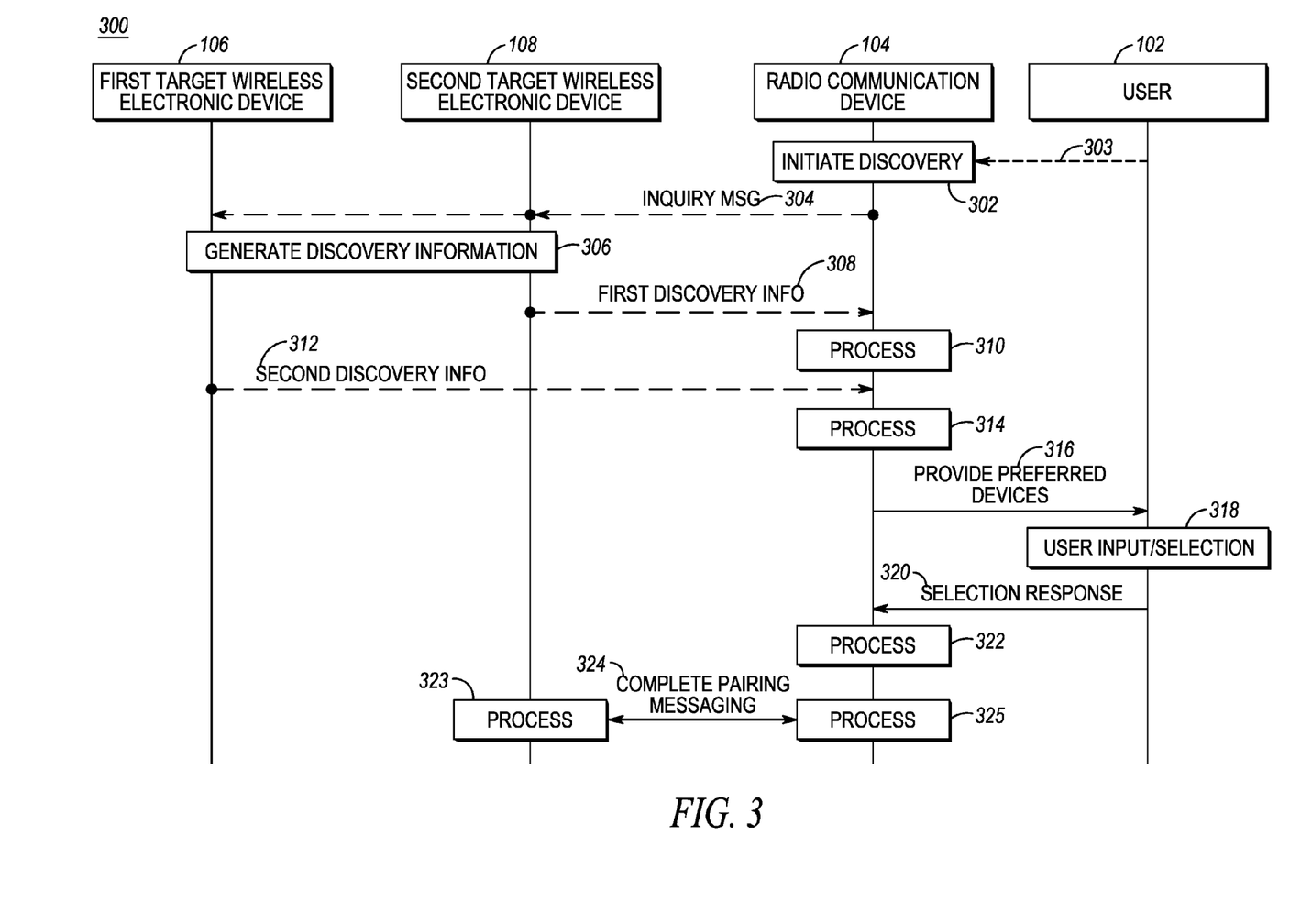
FIG. 3 illustrates a message sequence chart (MSC) showing transmissions, receptions, and process steps for improved device pairing in accordance with some embodiments.

The first target wireless electronic device 106 comprises: a microcontroller or digital signal processor (DSP) 206; a short-range wireless radio 208 with a corresponding antenna 210 for communicating with wireless radio communication device 104 via a short-range link 222 (which may include a Bluetooth radio 208 and Bluetooth link 222, an NFC radio 208 and NFC link 222, an IEEE 802.11 Wi-Fi radio 208 and IEEE 802.11 Wi-Fi link 222, or an IrDA transmitter 208 and IrDA link 222, among other possibilities); a user interface 217 (which may include a display and/or LEDs, a touch input interface, a mechanical input interface, and/or one or more buttons or switches, among other possibilities); a computer readable storage 218 (which may store computer readable instructions that, when executed by the microcontroller 206, perform one or more of the transmitting, receiving, and/or processing steps set forth in FIG. 3 and/or may store physical state information describing a particular physical state of the first target wireless electronic device); audio devices 219 (which may include a speaker for providing output audio to a user and a microphone for capturing user input and providing it to the wireless radio communication device 104); power management circuit 220 (which monitors a battery and/or AC/DC wired input power connection and provides power status information to microcontroller 206); and a movement sensor 221 for detecting movement of the first wireless electronic device 106. Additional electronic circuits may be added providing additional feature sets as well. For example, in some embodiments, the first target wireless electronic device 106 may include a second short-range wireless radio (selected from those listed above) different from the first short-range wireless radio 208 for transmitting physical state information out-of-band consistent with the disclosure set forth with respect to FIG. 3 below. Other possibilities exist as well.

The second target wireless electronic device 108 comprises: a microcontroller or DSP 232; a short-range wireless radio 228 with a corresponding antenna 230 for communicating with wireless radio communication device 104 via a short-range link 223 (which may include a Bluetooth radio 228 and Bluetooth link 223, an NFC radio 228 and NFC link 223, an IEEE 802.11 Wi-Fi radio 228 and IEEE 802.11 Wi-Fi link 223, or an IrDA transmitter 228 and IrDA link 223, among other possibilities); a user interface 239 (which may include a display and/or LEDs, a touch input interface, a mechanical input interface, and/or one or more buttons or switches, among other possibilities); a computer readable storage 240 (which may store computer readable instructions that, when executed by the microcontroller 206, perform one or more of the transmitting, receiving, and/or processing steps set forth in FIG. 3 and/or may store physical state information describing a particular physical state of the second target wireless electronic device); video capture device 241 (which may include an imaging device such as a CMOS sensor and/or audio device such as a microphone for capturing video and/or audio and providing one or both to the wireless radio communication device 104); power management circuit 242 (which monitors a battery and/or AC/DC wired input power connection and provides power status information to microcontroller 232); and a movement sensor 243 for detecting movement of the second wireless electronic device 108. Additional electronic circuits may be added providing additional feature sets as well. For example, in some embodiments, the second target wireless electronic device 108 may include a second short-range wireless radio (selected from those listed above) different from the first short-range wireless radio 228 for transmitting physical state information out-of-band consistent with the disclosure set forth with respect to FIG. 3 below. Other possibilities exist as well.

Scanning wireless radio communication device 104 comprises: a microcontroller or DSP 256; a short-range wireless radio 258 with a corresponding antenna 260 for communicating with other devices via short-range links 222, 223 (which may include a Bluetooth radio 258 and Bluetooth links 222, 223, an NFC radio 258 and NFC links 222, 223, an IEEE 802.11 Wi-Fi radio 258 and IEEE 802.11 Wi-Fi links 222, 223, or an IrDA transmitter 258 and IrDA link 222, 223, among other possibilities); a two-way narrowband (NB) or broadband (BB) radio 270 and corresponding antenna 272; a user interface 267 (which may include a display and/or LEDs, a touch input interface, a mechanical input interface, and/or one or more buttons or switches, among other possibilities); and a computer readable storage 268 (which may store computer readable instructions that, when executed by the microcontroller 256, perform one or more of the transmitting, receiving, and/or processing steps set forth in FIG. 3 and/or may store a physical-state to preferred discoverable target wireless electronic device mapping that identifies particular states of target wireless electronic devices associated with an intended indication of a preference to pair with, the particular states being equivalent across all target wireless electronic devices or varying based on an identity, make, and/or model of the target wireless electronic device stored at the wireless radio communication device or indicated over-the-air to the wireless radio communication device 104 from the respective target wireless electronic device).

The two-way NB or BB radio 270 may operate according to an industry standard land mobile radio (LMR) protocol such as, for example, the Project 25 (P25) standard defined by the Association of Public Safety Communications Officials International (APCO), the TETRA standard defined by the European Telecommunication Standards Institute (ETSI), the Digital Private Mobile Radio (dPMR) standard also defined by the ETSI, or the Digital Mobile Radio (DMR) standard also defined by the ETSI. The two-way NB or BB radio 270 may additionally or alternatively operate according to an industry standard broadband protocol such as, for example, the Long Term Evolution (LTE) protocol including multimedia broadcast multicast services (MBMS), the open mobile alliance (OMA) push to talk (PTT) over cellular (OMA-PoC) standard, the voice over IP (VoIP) standard, or the PTT over IP (PoIP) standard, among many other possibilities.

The wireless radio communication device 104 may also include additional electronic circuits providing additional feature sets as well. For example, in some embodiments, the wireless radio communication device 104 may include a second short-range wireless radio (selected from those listed above) different from the first short-range wireless radio 258 for transmitting physical state information out-of-band consistent with the disclosure set forth with respect to FIG. 3 below. Other possibilities exist as well.

2. Processes for Improving Device Pairing

Turning now to FIG. 3, a message sequence chart illustrates a method 300 for device pairing between a scanning wireless radio communication device and one or more target wireless electronic devices. Method 300 is illustrated as occurring between first target wireless electronic device 106, second target wireless electronic device 108, wireless radio communication device 104, and a user 102. While two target wireless electronic devices 106, 108 are illustrated in FIG. 3 for ease of illustration purposes, same or similar steps may be executed for a single target wireless electronic device or for more than two target wireless electronic devices, such as but not limited to target wireless electronic devices 110-118 of FIG. 1, in a same or similar manner to that described below.

Method 300 begins by a user 102, such as an officer, initiating a discovery process 302 at wireless radio communication device 104 via an interaction 303 with a user interface of the wireless radio communication device. For example, the user 102 may navigate a menu within the wireless radio communication device 104 and select a "pair with new device" or "replace existing device with new device" option from a displayed menu of its user interface 267. In other embodiments, the wireless radio communication device 104 may automatically initiate a discovery process, perhaps based on a detected context such as detecting a location within a "setup" room of a police station or in response to detecting discovery information over-the-air from one or more, or a threshold number (such as >5 or 10) of target wireless electronic devices.

In any event, at step 302, the wireless radio communication device 104 initiates a target wireless electronic device discovery process in which it searches for target wireless electronic devices to connect with using a short-range transceiver over a short-range communication link. The particular steps involved in initiating the discovery process will vary depending on the short-range protocol implemented between the wireless radio communication device and the target wireless electronic devices. For example, and as illustrated via InquiryMessage 304 in FIG. 3, in an example where the devices 104, 106, 108 implement the Bluetooth short-range wireless protocol, wireless radio communication device 104 may transmit the InquiryMessage 304, to which Bluetooth devices in a general discoverable or limited discoverable mode may respond. In another example in which devices 104, 106, 108 implement an IEEE 802.11 Wi-Fi short-range wireless protocol, wireless radio communication device 104 may not need to transmit an inquiry message, but may instead begin monitoring for wireless beacon messages transmitted by target wireless electronic devices in an access point mode at subsequent steps 310 and 314. Other short-range wireless protocols may operate in same or similar fashions to one or both of the Bluetooth and IEEE 802.11 Wi-Fi short-range wireless protocols.

At step 306, and perhaps in response to receiving InquiryMessage 304 (when implementing the Bluetooth protocol) or perhaps on a periodic basis (when implementing the IEEE 802.11 Wi-Fi protocol), each of the first 106 and second 108 target wireless electronic devices may generate discovery information. Again, the particular discovery information may vary based on the particular short-range protocol implemented between the wireless radio communication device 104 and target wireless electronic devices 106, 108. For example, in the case of the Bluetooth protocol, discovery information generated at step 306 may include one or more of a Bluetooth hardware address, a Bluetooth device name, clock information, a Bluetooth class, Bluetooth profile information, and any additional extended inquiry response (EIR) information of the respective target wireless electronic devices 106, 108, among other possible information and signaling. Alternatively, in the case of the IEEE 802.11 Wi-Fi protocol, discovery information generated at step 306 may include a Wireless MAC address, a timestamp, a beacon interval, a Service Set Identifier (SSID), supported transmission rates, and security protocols support of the respective target wireless electronic devices 106, 108, among other possible information and signaling. Other possibilities exist for other short-range protocols as well.

Regardless of which short-range protocol is implemented between the wireless radio communication device 104 and target wireless electronic devices 106, 108, however, the information generated at step 306 at each of the first target wireless electronic device 106 and the second target wireless electronic device 108 also includes physical state information describing a particular physical state of the respective target wireless electronic device.

For example, the physical state information may be information reflecting current activation of a particular input of a respective user interface 217, 239 of the respective target wireless electronic devices 106, 108. More specifically, the physical state information may reflect activation of a particular hard or soft key input particularly associated with and labeled for uniquely identifying a preferred target wireless electronic device to pair with, or may reflect activation of a particular hard or soft key input having a primary purpose entirely unrelated to uniquely identifying a preferred target wireless electronic device to pair with (such as, for example, activation of a tactile switch such as a push-to-talk (PTT) input, activation of a channel change dial or knob, activation of a channel up or down key, activation of a volume up or down key, activation of a battery-life remaining input, activation of a power on or off switch, or activation of a particular touch screen area associated with one of the above functions or a separate function).

In still further examples, the physical state information may be information indicative of a particular power state of the respective target wireless electronic device reported by the respective power management circuits 220, 242, such as whether the target wireless electronic device is plugged in or running on batteries, is plugged in an charging via a USB port, is plugged in an charging via a wall-charger, is fully charged, or some other power-related physical state indicator. In still other examples, the physical state information may be information indicative of a particular type of removable storage 217 inserted into the target wireless electronic device (such as a secure digital (SD) card, a universal serial bus (USB) mass storage device, or a compact flash (CF) card).

In further examples, the physical state information may be information indicative of a particular sound level at a microphone input of an audio device 219 detected above a threshold level (e.g., as a result of a user blowing or yelling into a microphone), or of a particular color sheet presented in front of a video imaging device 241.

In even further examples, the physical state information may be information indicative of movement from a movement sensor 221, 243 (such as an accelerometer, magnetometer, and/or gyroscope) that indicates one or more of orientation, direction, steps, acceleration, and/or speed information, information from a light sensor indicative of an amount of light hitting an optical transducer, and/or information from a heat sensor indicative of a sensed temperature adjacent the heat sensor. Other examples of physical state information are possible as well.

In any event, after each of the first and second target wireless electronic devices 106, 108 generate respective discovery information they may separately transmit the generated discovery information in FirstDiscoveryInfo message 308 and SecondDiscoveryInfo message 312.

The FirstDiscoveryInfo message 308 and SecondDiscoveryInfo message 312 may include standard-specific discovery information (e.g., such as a Bluetooth hardware address of the respective target wireless electronic device 106, 108, a Bluetooth device name, clock information, a Bluetooth class, Bluetooth profile information, and/or any additional extended inquiry response (EIR) information when the short-range communication link is a Bluetooth communication link, or a Wireless MAC address, a timestamp, a beacon interval, a Service Set Identifier (SSID), supported transmission rates, and/or security protocols support when the short-range communication link is an IEEE 802.11 Wi-Fi communication link, among other possibilities) and physical state information integrated into the respective message 308, 312 in accordance with the protocol standard. For example, when the short-range communication link is a Bluetooth communication link, the physical state information may be included in a Bluetooth standards-compliant extended inquiry response (EIR) field in the First or SecondDiscoveryInfo message 308, 312. Alternatively, when the short-range communication link is an IEEE 802.11 Wi-Fi communication link, the physical state information may be included in a standards-compliant vendor specific information element (IE with Element ID 221) or encoded into one of a plurality of particular SSIDs (e.g., such that the SSID in the beacon frame varies dependent upon physical state information of the transmitting target wireless electronic device) in the First or SecondDiscoveryInfo message 308, 312. Other possibilities exist as well.

In another embodiment, physical state information may be transmitted in a separate message in a standards-compliant or non-standards compliant manner before or after the standards-compliant discovery information. In still another embodiment, the physical state information may be transmitted out-of-band via a secondary short-range communication link other than the first short-range communication link over which the discovery information is transmitted in First and SecondDiscoveryInfo messages 308, 312. For example, in circumstances where both the target wireless electronic device and the wireless radio communication device include secondary short-range transceivers, perhaps operating in accordance with a same (e.g., Bluetooth or IEEE 802.11 Wi-Fi) or different (e.g., Zigbee, IrDA, NFC) short-range wireless protocol, physical state information may be transmitted substantially in parallel with the discovery information over a secondary short-range communication link established between the devices using their respective secondary short-range transceivers.

In any event, at steps 310 and 314, the wireless radio communication device 104 receives the respective discovery information and physical state information transmitted in any manner as set forth above. The discovery information is used in a standards-compliant manner to align clocks, store identify information, and perform other functions in accordance with the respective short-range communications standard. The received physical state information, on the other hand, is correlated at the wireless radio communication device 104 with stored physical state information to identify a subset of all target wireless electronic devices providing discovery information that are preferred discoverable target wireless electronic devices. Only those target wireless electronic devices transmitting physical state information that is determined by the wireless radio communication device 104 to correlate to stored physical state information and thus indicate a preferred target wireless electronic device will be provided to a user (e.g., via display, audio, or some other feedback mechanism) as a device selection option to communicatively pair with.

As set forth above, the physical state information may be information reflecting current activation of a particular input of a respective user interface 217, 239 of the respective target wireless electronic devices 106, 108, may be information indicative of a particular power state of the respective target wireless electronic device, may be information indicative of a particular auditory input or visual-imaging input to a sensor at the respective target wireless electronic devices 106, 108, or may be information indicative of a state of a movement sensor, light sensor, or heat sensor, among other possibilities. As set forth above, the physical state information may be an input having a primary purpose other than pairing at the target wireless electronic device. At each of steps 310 and 314, the wireless radio communication device 104 may access a stored mapping of physical state information to preferred discoverable target wireless electronic device to determine if the particular physical state information is to be interpreted as an indication by a user that the respective target wireless electronic device is a preferred device for pairing with. For example, for the first target wireless electronic device 106 (which as set forth in FIG. 1 may be an RSM), the mapping stored at wireless radio communication device 104 may indicate that physical state information indicating activation of a PTT input of the RSM and/or an auditory level about a threshold level is associated with a pairing preference indication. As another example, for the second target wireless electronic device 108 (which as set forth in FIG. 1 may be a video camera), the mapping stored at wireless radio communication device 104 may indicate that physical state information indicating activation of a power cycle on/off input switch or a visual imaging detecting of a red-color above a threshold level is associated with a pairing preference indication. Of course, other possibilities exist as well, including but not limited to those other possibilities set forth throughout this disclosure. Further, while in this example the mapping is stored at wireless radio communication device 104, in other examples, the mapping may be stored at a remote device accessible to the wireless radio communication device via its short-range radio 258 or its longer-range two way radio 270. Still further, while in some embodiments the physical state information stored in the mapping may be identical for all target wireless electronic devices, in other embodiments the particular physical state information stored in the mapping that is associated with a pairing preference may vary depending upon target wireless electronic device identity, make, and/or model of the target wireless electronic device stored at the wireless radio communication device or indicated over-the-air to the wireless radio communication device from the respective target wireless electronic device.

In this example, we will assume that the first target wireless electronic device 106 provides no physical state information (e.g., indicating no activated inputs, power states, or sensor inputs associated with a pairing preference) or provides a particular power indication via its transmitted physical state information that is not associated with a pairing preference at wireless radio communication device 104, and that the second target wireless electronic device provides a particular user interface input via its transmitted physical state information that is associated with a pairing preference at wireless radio communication device 104. Responsive to making pairing preference determinations via the transmitted physical state information and mapping information, the wireless radio communication device 104 provides an indication to user 102 of located preferred pairing devices via the ProvidePreferredDevices 316 message. In one embodiment, the ProvidePreferredDevices 316 message contains text to display on an electronic display (e.g., via user interface 267) of wireless radio communication device 104 setting forth identified target wireless electronic device identities (names, hardware addresses, and/or other information obtained via the discovery process) that are determined preferred pairing devices, and not including identified target wireless electronic device identities that are not determined preferred pairing devices. In other embodiments, the ProvidePreferredDevices 316 message may contain text-to-voice information that is played back via a speaker (e.g., via user interface 267) of wireless radio communication device 104 setting forth identified target wireless electronic device identities (names, hardware addresses, and/or other information obtained via the discovery process) that are determined preferred pairing devices, and not including identified target wireless electronic device identities that are not determined preferred pairing devices. Other ways of presenting such information and determinations to user 102 may be possible as well. While in this example only two target wireless electronic devices are illustrated in FIG. 3 and only one of the two target wireless electronic devices is determined to be a preferred pairing device, in other embodiments more than two target wireless electronic devices may be involved in the discovery process and more than one target wireless electronic devices may be determined to be a preferred pairing device.

At step 318, a user input/selection is made by the user 102 and is detected via SelectionResponse 320 and processed at the wireless radio communication device 104. For example, an identifier associated with the second target wireless electronic device 108 may have been selected via a displayed list and list navigation buttons of a user interface 267 of wireless radio communication device 104 by user 102 at step 318 and the input activation detected via SelectionResponse 320 and processed by wireless radio communication device 104 at step 322. In another embodiment, the selection may have been detected via a microphone input and recognition of a selection via voice command. Other possibilities exist as well.

At step 322, the wireless radio communication device 104 processes the received SelectionResponse 320, and responsively begins a standards-compliant pairing process with the selected target wireless electronic device. In this example, and as shown in FIG. 3 via processing steps 323 and 325 and CompletePairingMessages 324, the second target wireless electronic device 108 and the wireless radio communication device 104 complete the pairing process and become paired via the same short-range communication link over which the FirstDiscoveryInfo message 308 was transmitted. In an embodiment in which the short-range communication link between devices 104, 108 is based on IEEE 802.11 Wi-Fi, the messaging 324 may include a message transmitted by wireless radio communication device 108 to the second target wireless electronic device 108 instructing the second target wireless electronic device 108 to switch from infrastructure mode to ad-hoc mode and begin the pairing process with wireless radio communication device 104 in ad-hoc mode. In an embodiment in which the short-range communication link is based on Bluetooth, the steps 323-325 may implement a legacy pairing (Bluetooth v. 2.0 and earlier) or a Secure Simple Pairing process (Bluetooth v. 2.1 and later).

While in the example set forth in FIG. 3, the physical state information was used to reduce the number of devices displayed or otherwise presented to a user 102 at steps 316-318, in other embodiments no such selection may be presented to the user 102 and the wireless radio communication device 104 may not execute steps 316-322. Instead, the wireless radio communication device 104 may immediately and automatically begin pairing at steps 323-325 with each target wireless electronic device determined to be a preferred pairing device at steps 310 and 314. In the example given above in which only the second target wireless electronic device 108 was determined to be a preferred pairing device, wireless radio communication device 104 may begin the pairing process 323-325 responsive to the determination at step 310 without executing steps 316-322. Similar steps could be executed for other target wireless electronic devices in examples where more than one preferred target wireless electronic device for pairing is determined to be present.

In a still further example, the user 102 may, at step 318, review the subset of preferred target wireless electronic devices for pairing and determine that a desired target wireless electronic device is not listed. In response, the user 102 may activate, and the wireless radio communication device 104 may detect, an input indicating a user's desire to see all detected target wireless electronic devices, including those determined not to be preferred target wireless electronic devices for pairing. In response, the wireless radio communication device 104 may provide a full list of all target wireless electronic devices regardless of physical state information to the user 102 (or just a list of non-preferred target wireless electronic devices not providing physical state information and/or providing physical state information that does not correlate with the stored physical state information) and, in response to receiving a subsequent selection via a step similar to SelectionResponse 320 processed at a step similar to step 322, similarly begin pairing with the indicated non-preferred target wireless electronic device via steps similar to steps 323-325.

3. Conclusion

In accordance with the foregoing, an improved method and system for device pairing between a scanning wireless radio communication device such as a mobile radio and target wireless electronic devices such as wireless accessory devices is provided. As a result of the foregoing, an Officer or other individual having a plurality of wireless accessory devices can more quickly and efficiently identify and subsequently pair with and connect to a particular one of a plurality of wireless accessory devices without having to guess as to which device out of a long list of devices is the desired target wireless device and without having to scroll through platitudes of other device identifiers to locate the particular desired target wireless device. Other advantages and benefits are possible as well.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings. The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation. The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. A method for improving device pairing between a scanning wireless radio communication device and target wireless electronic devices, the method comprising, at the scanning wireless radio communication device:

initiating, via a first wireless transceiver of the scanning wireless radio communication device, a discovery process for discovering available target wireless electronic devices that the scanning wireless radio communication device has not yet paired with via the first wireless transceiver, but that are available for wireless pairing, via the first wireless transceiver, and during the discovery process:

receiving, from each of a plurality of target wireless electronic devices, wireless pairing information including one or more of a wireless address of the target wireless electronic device, a wireless device name of the target wireless electronic device, clock information of the target wireless electronic device, a class type of the target wireless electronic device, a page scan mode of the target wireless electronic device, a timestamp, a beacon interval, a Service Set Identifier (SSID), supported transmission rates, and supported security protocols;

receiving, from some or all of the target wireless electronic devices, separate from and in addition to the wireless pairing information, physical state information describing a particular physical state of the target wireless electronic device;

for each target wireless electronic device providing the particular physical state of the target wireless electronic device, correlating the received physical state information with a state information mapping stored at the scanning wireless radio communication device and associated with an indication that the target wireless electronic device is a preferred discoverable target wireless electronic device; and one of (i) the scanning wireless radio communication device automatically initiating pairing with each one or more target wireless electronic devices providing the received physical state information that positively correlates with the state information mapping stored at the wireless radio communication device and (ii) displaying, via a wireless pairing selection display of the scanning wireless radio communication device, only those one or more target wireless electronic devices providing the received physical state information that positively correlates with the state information mapping stored at the scanning wireless radio communication device.

2. The method of claim 1, wherein the scanning wireless radio communication device automatically initiates pairing with each one or more target wireless electronic devices providing the received physical state information that positively correlates with the state information mapping stored at the wireless radio communication device.

3. The method of claim 1, wherein the scanning wireless radio communication device displays, via the wireless pairing selection display of the scanning wireless radio communication device, only those one or more target wireless electronic devices providing the received physical state information that positively correlates with the state information mapping stored at the scanning wireless radio communication device.

4. The method of claim 3, the method further comprising: responsive to receiving a user input selecting one of the displayed target wireless electronic devices, initiating wireless pairing with the selected target wireless electronic devices.

5. The method of claim 3, the method further comprising: responsive to receiving a user input requesting a larger list of discoverable wireless electronic devices, displaying, in addition to those one or more target wireless electronic devices providing the received physical state information that positively correlates with the state information mapping stored at the scanning wireless radio communication device, those one or more target wireless electronic devices not providing physical state information or providing physical state information that does not positively correlate with the state information mapping stored at the scanning wireless radio communication.

6. The method of claim 1, wherein the physical state information is information identifying activation of a target wireless electronic device primary function unrelated to wireless pairing, but which serves as a secondary indicator of a preferred discoverable target wireless electronic device.

7. The method of claim 6, wherein the physical state information is one of a universal serial bus (USB) power state, a tactile switch depression state having a primary function at the target wireless electronic device unrelated to wireless pairing, and an environmental sensor state.

8. The method of claim 7, wherein the physical state information is the environmental sensor state of an environmental sensor at the target wireless electronic device selected from a light sensor, a movement sensor, and a heat sensor.

9. The method of claim 7, wherein the physical state information is a tactile switch depression state having a primary function of causing a battery life-remaining indicator to be displayed at the target wireless electronic device.

10. The method of claim 7, wherein the physical state information is a power switch depression state having a primary function of causing the target wireless electronic device to power on and/or off.

11. The method of claim 1, wherein initiating the discovery process comprising broadcasting a Bluetooth inquiry message, and wherein receiving physical state information describing the particular physical state of the target wireless electronic device comprises receiving the physical state information in a Bluetooth extended inquiry response (EIR) message.

12. The method of claim 1, wherein initiating the discovery process comprising entering an IEEE 802.11 Wi-Fi access point beacon monitoring mode, and wherein receiving physical state information describing the particular physical state of the target wireless electronic device comprises receiving the physical state information in an IEEE access point beacon message also containing a Service Set Identifier (SSID) associated with the target wireless electronic device.

13. The method of claim 12, wherein the scanning wireless radio communication device automatically initiates pairing with each one or more target wireless electronic devices providing the received physical state information that positively correlates with the state information mapping stored at the wireless radio communication device by transmitting an instruction to switch from an access point mode to an IEEE ad-hoc mode and pairing in an IEEE ad-hoc mode.

14. The method of claim 1, wherein the state information mapping stored at the scanning wireless radio communication device includes different physical states associated with an indication that the target wireless electronic device is a preferred discoverable target wireless electronic device that vary based on a identity, make, and/or model of the target wireless electronic device.

15. The method of claim 14, the method further comprising for each target wireless electronic device providing the particular physical state of the target wireless electronic device, and along with the particular physical state of the target wireless electronic device, receiving one or both of make and model of the target wireless electronic device;
  wherein correlating the received physical state information with state information mapping stored at the scanning wireless radio communication device further comprises identifying the state information mapping stored at the scanning wireless radio communication device associated with an indication that the target wireless electronic device is a preferred discoverable target wireless electronic device as a function of the one or both of the make and model of the target wireless electronic device.

16. The method of claim 1, wherein the physical state information describing a particular physical state of the target wireless electronic device is received via the first wireless transceiver.

17. The method of claim 1, wherein the physical state information describing a particular physical state of the target wireless electronic device is received out of band via a second transceiver of the scanning wireless radio communication device that is separate from the first wireless transceiver.

18. The method of claim 17, wherein the second transceiver is one of a near-field communication (NFC) transceiver and an infrared data association (IrDA) transceiver.

19. The method of claim 1, wherein each of the plurality of target wireless electronic devices is an electronic sensor device implementing Bluetooth Secure Simple Pairing.

20. A wireless radio communication device for improving device pairing with target wireless electronic devices, the wireless radio communication device comprising:

one or more short-range wireless transceivers;
a microphone;
a speaker;
a display;
a data store; and
one or more processors configured to:
   initiate, via a first wireless transceiver of the one or more short-range wireless transceivers, a discovery process for discovering available target wireless electronic devices for wireless pairing via the first wireless transceiver, and during the discovery process:
      receive, from each of a plurality of target wireless electronic devices via the one or more short-range wireless transceivers, wireless pairing information including one or more of a wireless address of the target wireless electronic device, a wireless device name of the target wireless electronic device, clock information of the target wireless electronic device, a class type of the target wireless electronic device, a page scan mode of the target wireless electronic device, a timestamp, a beacon interval, a Service Set Identifier (SSID), supported transmission rates, and supported security protocols;
      receive, from some or all of the target wireless electronic devices via the one or more short-range wireless transceivers, and in addition to the wireless pairing information, physical state information describing a particular physical state of the target wireless electronic device;
   for each target wireless electronic device providing the particular physical state of the target wireless electronic device, correlate the received physical state information with a state information mapping stored at the scanning wireless radio communication device and associated with an indication that the target wireless electronic device is a preferred discoverable target wireless electronic device; and
   one of (i) automatically initiate pairing with each one or more target wireless electronic devices providing the received physical state information that positively correlates with the state information mapping stored at the wireless radio communication device and (ii) display, on the display, only those one or more target wireless electronic devices providing the received physical state information that positively correlates with the state information mapping stored at the scanning wireless radio communication device.

* * * * *